Figure 4:
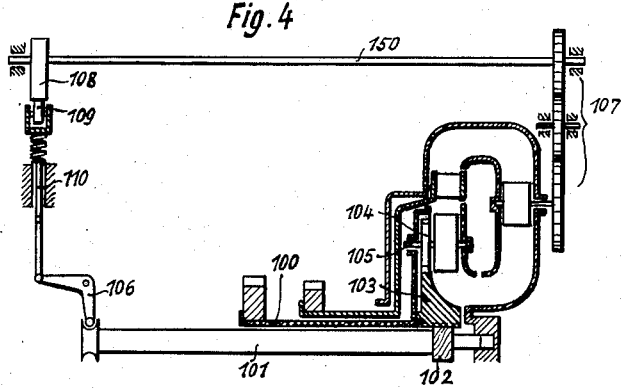

June 17, 1958
F. K. KUGEL
2,839,011
DRIVE FOR USE IN CONNECTION WITH ELECTRICALLY
OPERATED SELF PROPELLED VEHICLES
Filed Nov. 13, 1952
3 Sheets-Sheet 1
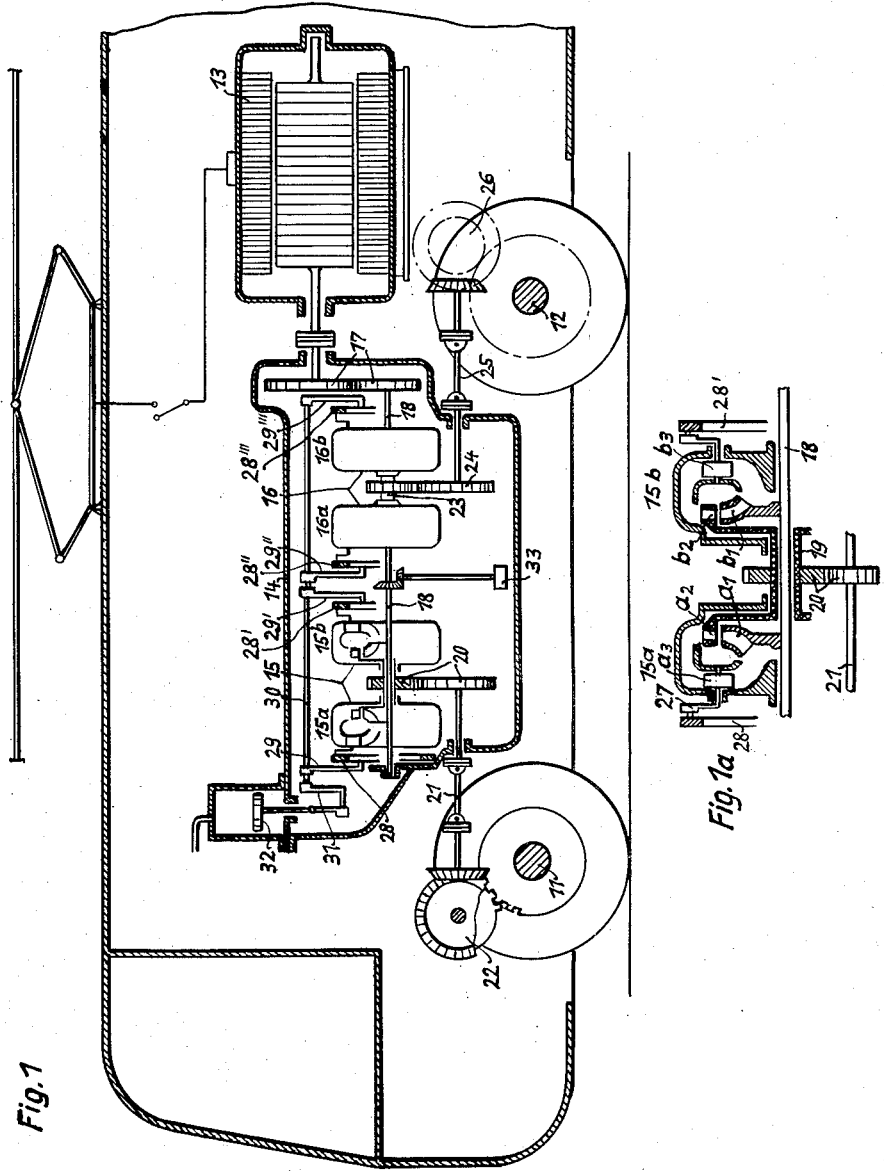
INVENTOR.
Fritz Karl Kugel
BY
Patent Agent

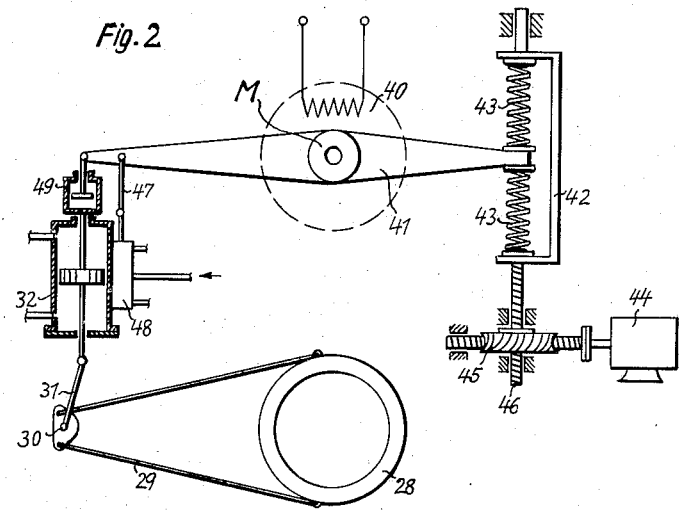
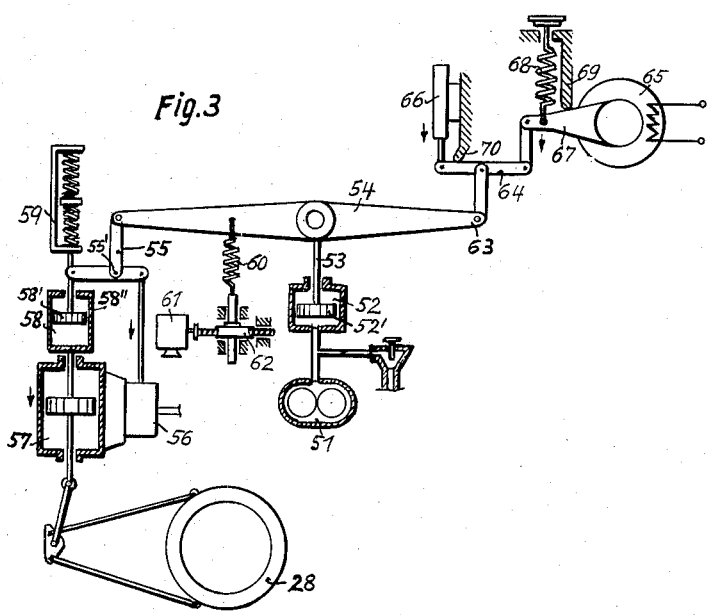

ǸUnited States Patent Office 2,839,011
Patented June 17, 1958

2,839,011

DRIVE FOR USE IN CONNECTION WITH ELECTRICALLY OPERATED SELF PROPELLED VEHICLES

Fritz Karl Kugel, Heidenheim (Brenz), Germany, assignor to J. M. Voith G. m. b. H., Maschinenfabrik Heidenheim, Germany Application November 13, 1952, Serial No. 320,181

Claims priority, application Germany November 17, 1951

25 Claims. (Cl. 105—96.2)

The present invention relates to a drive for use in connection with electrically operated self-propelled vehicles. With electric locomotives and self-propelled cars receiving electric energy from a fixed contact wire through a current collector, the employment of three phase current with a frequency of fifty cycles per second or sixty cycles per second, as usually available in industrial networks, causes great difficulties. For this reason, for the operation of electric railways special networks with smaller frequency, mostly 16⅔ cycles per second, 20 cycles per second, 25 cycles per second or 30 cycles per second have frequently been employed so that commutator motors with their economic speed control, their high power factor, and great starting torque can be used as driving motors.

According to another suggestion, the locomotives have been equipped with special converters, e. g. motor-generator sets, rotary converters, etc. by means of which the available three phase current is transformed into direct current, thereby making it possible to use variable direct current motors.

The above referred to arrangements are, however, relatively complicated and rather expensive.

It is, therefore, an object of the present invention to provide a drive for use in connection with electrically operated self-propelled vehicles which will make it possible to make use of three phase current of normal frequency in a more economic and simpler manner than heretofore possible.

It is a further object of this invention to provide a drive for use in connection with electrically operated self-propelled vehicles which will make it possible to use three phase current of normal frequency while employing non-variable electric motors.

It is a still further object of the invention to provide an arrangement of the type set forth in the preceding paragraphs which will make it possible to connect the driving motor with the network without requiring the intervention of a transformer or converter.

These and other objects and advantages of the invention will appear more clearly from the following specification in connection with the accompanying drawings in which:

Fig. 1 diagrammatically illustrates a self-propelled car with an electric squirrel-cage rotor induction motor and with two driven axles, each of said axles having associated therewith a fluid transmission with two torque converters.

Fig. 1a shows a portion of Fig. 1 on a somewhat larger scale than the latter.

Fig. 2 diagrammatically illustrates an embodiment of the control arrangement according to the invention for automatically adjusting the power input of the fluid transmission for constant electric current or constant electric power respectively.

Fig. 3 is a diagrammatic representation of an embodiment of an arrangement according to the invention, which is adapted automatically to adjust the power input of the fluid transmission in accordance with selected speeds and which also comprises additional means for limiting electric power and temperature.

Fig. 4 diagrammatically illustrates an arrangement for adjusting the pump vanes of a hydraulic torque converter and also illustrates how the adjustment of the pump vanes may be coupled with the adjustment of guide wheel vanes.

Figure 5:
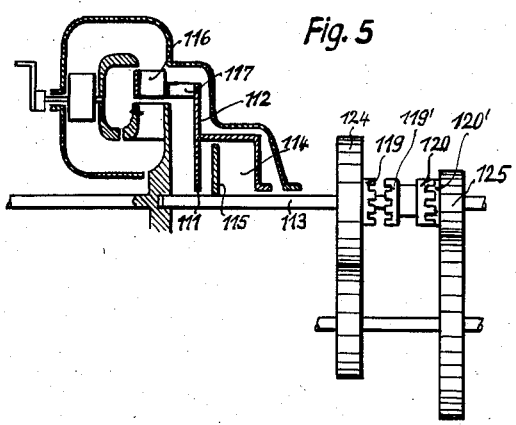

Fig. 5 diagrammatically illustrates a hydraulic torque converter with adjustable guide wheel vanes and with axially adjustable or shiftable turbine wheel ring and a subsequent two speed variable gear transmission.

Figure 6:
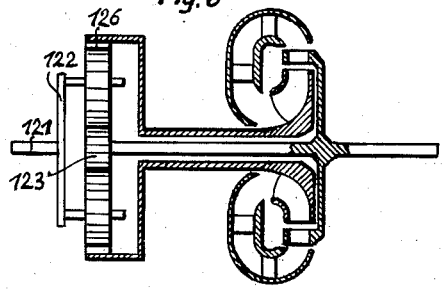

Fig. 6 is a diagrammatic representation of a further infinitely variable hydraulic transmission comprising a hydro-mechanical power divider having a fluid circuit combined with a planetary gear transmission.

General arrangement

According to the present invention, the problem of simplifying and reducing the cost of drives for electrically operated vehicles has been solved by equipping the drive with ordinary non-variable electric motors, particularly squirrel-cage rotor-induction motors, and a variable hydrodynamic transmission which is infinitely variable by control means to vary the power intake. Ordinary induction motors are not only cheaper than commutator motors but can also be driven directly by three-phase current of normal frequency and voltage available in all industrial networks. The control of the driving speed and adjustment in accordance with various operating conditions is carried out in an extremely simple, cheaper, and more reliable manner by controlling the hydraulic power transmission.

Infinitely variable torque converters are particularly advantageous for use in connection with hydrodynamic power transmissions. Such hydraulic torque converters may be controlled in a simple manner by adjusting the vanes of the blades of the guide wheel or the vanes of a rotating wheel, i. e., of the turbine or of the pump wheel, or such adjustment may be effected by simultaneously adjusting a plurality of vane rings. Also, the employment of vane rings adapted to be thrown in and out, or the connecting and disconnecting of individual vane rings or parts of vane rings is known per se for the control of such transmissions and is applicable for use in connection with the present invention. It is essential that the power transmission at constant driving speed will permit a stepless or infinite control of the rate of power input and the output speed.

According to a further feature of the present invention, the hydraulic transmission is combined with a multi-speed gear transmission, the arrangement being such that the control, particularly guide vane control, of the torque converter may simultaneously be used for interrupting the power flow when shifting the mechanical change speed gear.

In a manner known per se, and in order to facilitate the shifting operation, particularly in order to improve the interruption of the power flow when shifting or during the idling period, a control effected by blade adjustment may be combined with a control effected by shifting of a vane ring. Thus, for instance, the turbine wheel may be withdrawn from the working circuit when shifting the change speed gear, while in its place a braking or backwards vane ring is introduced into the circuit.

Among others, so-called hydro-mechanical two-way transmissions are applicable for such vehicle drives. Such hydro-mechanical two-way transmissions are transmissions in which two parallelly arranged fluid circuits with subsequent change speed gears are employed, the arrangement being such that the power flow passes alternately through one fluid circuit and then in the next speed through the other fluid circuit. The said fluid circuits may be made effective and ineffective by filling and emptying the same respectively, whereas, for shifting the mechanical speeds, in the respective non-loaded power path the next speed is prepared.

According to a further embodiment of the variable hydraulic transmission a hydro-mechanical power divider transmission is provided in which a fluid circuit is combined with a planetary gear transmission in such a way that one portion of the power is conveyed through the fluid circuit, while another portion is conveyed mechanically, the arrangement being such that with increasing speed, the hydraulic power component decreases more and more, whereas, the mechanical power component increases proportionately.

By simultaneously employing a vane control in the fluid circuit, a slow-down of the driving motor will be prevented.

According to a particular feature of the present invention, a hydraulic power transmission is provided with two hydrodynamic torque converters which are designed for different ratios between the input speed and the output speed, in other words for different driving speed ranges, or which cooperate with different mechanical drive or output transmissions. The alternating throwing in and taking out of the torque converters can be effected by filling and emptying in a manner known per se. The filling may preferably be effected by means of a filling pump which through a control valve controls the supply of the actuating fluid to the various fluid circuits.

With such an arrangement having two torque converters, the filling of the converter intended for starting would be initiated by the engineer of the vehicle, as soon as the engineer enters the impulse for starting. The switching over from the starting torque converter to the converter for the higher speed and reversely the switching back from the last mentioned converter to the starting converter may be effected automatically in conformity with an appropriate working factor such as the travelling speed.

The control or adjustment of the desired driving power at the individual driven axles can be effected in various manners. For instance, the engineer may directly control the fluid power transmission, or a special device may be used which automatically in conformity with a predetermined voltage of the electric driving motor as adjusted by the engineer effects for instance a blade adjustment in the converter. A further control possibility consists in that the engineer sets the respective desired travelling speed at which by means of a control member responsive to said speed the power transmission is automatically controlled in such a manner that it will furnish the driving power required for the desired speed.

According to a further arrangement of the present invention, the control mechanism of the power transmission is provided with a safety device which works in such a manner that by a closing movement of the adjustable guide vanes of a torque converter, the power input into the power transmission is automatically limited as soon as in the electric motor or in the actuating liquid of the hydraulic power transmission a predetermined upper temperature limit is exceeded.

In order to simplify the control of such drives, according to a further feature of the invention, a single control member such as a manually operable crank, a manually operable lever or the like is adapted to bring about the throwing in and the taking out of the electrical wiring, the throwing in and the taking out of the electric motor, the throwing in and the taking out of the hydraulic power transmission, for instance, by filling and emptying, and finally the adjustment of the power intake into the hydraulic power transmission in conformity with the various driving stages by correspondingly adjusting the blades or, as mentioned, by adjusting a certain current input of the electric motor or also by adjusting a predetermined speed.

According to a further feature of the invention, the entire driving arrangement is still further simplified by designing the driving motor for the normal frequency and for the voltage which is available at the contact wire, for instance 15,000 volts, so that said voltage can directly be applied thereto without the intervention of a transformer.

In such an instance, only a small auxiliary transformer would be needed for the operation of auxiliary machinery and installations such as the compressor, lighting system, heating, and so on. The hydraulic system is preferably so designed that its pumping part may directly be coupled to the electric motor, i. e., without speed-up gear transmission.

The torque may be conveyed from the hydraulic transmission to the individual axles in any standard manner through universal joint shafts and axle gears rigidly connected to the respective axle. Such a construction results in smaller uncushioned masses on the axles than is the case with the known arrangements comprising axle-mounted motors.

According to a further feature of this invention, each axle has provided therefor an individual hydraulic transmission including a reversing gear. A reduction of the uncushioned masses may be obtained by driving the axle, for instance through a hollow shaft drive with links or quill-gear drives. Each individual axle drive may have associated therewith an individual electric motor, or if desired, all transmissions or a group of transmissions may have associated therewith one electric motor common thereto. When driving all individual transmissions or at least one group of transmissions by one motor common thereto, a variable number of axles may be driven at the various driving stages in a manner known per se. When driving, for instance, two axles, such an embodiment of a hydraulic transmission may be employed according to which during the starting range and within the range of low speeds, each axle is driven through one individual converter designed for half the power, whereas, within the range of the higher speeds or driving speeds with lower pulling forces, only one axle is driven and this by another converter designed for the full power.

According to a special feature of the invention the arrangement just referred to may be modified so that one of the torque converters which is in operation during the starting period is designed for the full power but during the starting period has its power intake so throttled by an adjustment of the blades that said converter together with the other converter designed for half the power and associated with the second axle imposes just the full load on the motor. After a predetermined driving speed has been obtained, that converter designed for half the power and associated with said last mentioned axle is taken out while simultaneously the torque converter associated with the first mentioned axle for the starting period has its power input changed to such an extent that it will now be able alone to take up the motor power. After a further increase in the driving speed and in order to change to the third speed, a shifting over to the torque converter for the higher speed is effected.

Structural arrangement

Referring now to the drawings and Fig. 1 thereof in particular, the structure shown therein illustrates a rail vehicle according to the present invention, in which the two axles 11 and 12 are driven by an electric motor 13, e. g. a squirrel-cage rotor-induction motor, common to both axles. This drive is effected through the intervention of fluid transmissions 15 and 16 arranged in a casing 14 housing both said transmissions 15 and 16. The motor shaft first drives a speed-up transmission 17, the smaller gear of which is mounted on the pump wheel shaft 18 extending through the fluid transmissions. Each of the fluid transmissions 16 comprises two hydraulic torque converters 15a and 15b, and 16a and 16b respectively. The pump wheels $a_1$ and $b_1$ are mounted on the shaft 18. The two converters 15a and 15b are so arranged that their pump wheels $a_1$ and $b_1$, as well as their turbine wheels $a_2$ and $b_2$ are located on the adjacent sides of the converters 15a and 15b, whereas, the guide wheels or the reaction members $a_3$ and $b_3$ are arranged adjacent the remote sides of said torque converters 15a and 15b. The two turbine wheels $a_2$ and $b_2$ are mounted on a shaft 19 common to both, which shaft through the intervention of a gear transmission 20 drives the universal joint shaft 21, which latter is adapted to drive the gear 22 of the axle 11.

The two torque converters 15a and 15b are designed for a different inner transmission ratio in such a manner that the torque converter 15a covers the lower speed range, whereas the torque converter 15b covers the upper speed range.

The two converters 16a and 16b for driving the axle 12 are designed similarly to the two torque converters 15a and 15b. The torque converters 16a covers the lower speed range and the torque converters 16b covers the upper speed range. The turbine shaft 23 common to the two converters 16a and 16b drives the axle 12 through the intervention of the gear transmission 24, the universal joint shaft 25 and the transmission 26.

In order to be able infinitely to vary the power intake of the converters, the said converters may be provided with adjustable guide vanes as illustrated in Figs. 1 and 1a. The said guide vanes are rotatably mounted in the stationary casing of the respective converter and have connected thereto pivots protruding outwardly. Connected to said pivots are adjustable cranks 27 which are respectively connected to adjusting rings 28, 28', 28'', 28'''. The said adjusting rings are adapted to be actuated by an adjusting shaft 30 through the intervention of rod systems 29, 29', 29'', and 29'''. The adjusting shaft 30 in its turn is adapted to be actuated by a servo motor 32 through the intervention of a crank 31.

The power intake of the hydraulic torque converters may, of course, also be varied by adjusting the pump vanes or by adjusting the turbine vanes. An adjustment of the pump vanes for adjusting the power intake of the converters is shown in Fig. 4 according to which an adjusting shaft 101 is mounted within the pump shaft 100. The inner end of the shaft 101 is provided with a coarse thread 102 meshing with a corresponding thread in the hub of a disc 102. The periphery of the disc 103 is provided with teeth meshing with pinions 104 which are keyed to the shaft 105 of the pump vanes rotatably mounted in the pump wheel. By moving the adjusting shaft 101 in axial direction thereof toward the left or toward the right, the pump vanes are turned in one or the other direction.

Fig. 4 also illustrates how the pump vane adjustment may be coupled with the guide vane adjustment. In order to obtain the best possible degree of efficiency, each guide vane position should have associated therewith a predetermined pump vane position. In order to obtain this position, gears 107 are operatively connected to the guide vane pivots which gears convey their angular position in any convenient manner, for instance, by means of a shaft 150 to a cam disc 108. This cam disc, depending upon its position, more or less depresses a rod 110 through the intervention of a roller 109 so that following a predetermined law, the bell crank lever 106 will move rod 101 and thus the pump blades will be adjusted accordingly.

The intake of the torque converter may also be varied by adjusting or shifting the turbine ring. In this connection reference may be had to Fig. 5 which shows a hydraulic torque converter with adjustable guide vanes and axially movable turbine vane ring followed by a two-speed change gear transmission. As will be seen from Fig. 5, the hub 111 of the turbine wheel 112 is nonrotatably but axially movable mounted on a shaft 113 passing through a gear 124 and operatively connected to the clutch element 119'. The hub 111 simultaneously forms a pressure cylinder 114 the piston 115 of which is rigidly connected to the shaft 113. Also connected to the gear 124 is a jaw clutch member 119 adapted to engage the jaw clutch element 119' which is mounted on a sleeve carrying a jaw clutch member 120 adapted to engage and disengage a corresponding jaw clutch element 120' connected to a gear 125. By supplying pressure to the cylinder 114 at one or the other side of the piston 115, it is possible selectively to make the normal turbine blading 116 effective or to make a brake blading 117 effective.

The clutch elements 119, 119', and 120, 120' pertaining to the change gear transmission may be designed as throw-off clutch elements adapted to be shifted also during the operation of the device. A further possibility of varying the fluid transmission consists in providing a hydro-mechanical power divider transmission in which a fluid circuit is combined with a planetary gear transmission in such a manner that a portion of the power is conveyed through the hydraulic circuit and another portion is conveyed mechanically, the hydraulic power shares or components decreasing more and more with increasing speed while the mechanical power component increases accordingly. Such an arrangement is shown in Fig. 6 in which the shaft 121 represents the motor shaft and is connected with the carrier 122 of the planet gears of a planetary gear transmission the sun wheel 123 of which is connected with the turbine wheel. The gear ring 126 of the planetary gear transmission is connected with the pump wheel.

Referring back to Fig. 1, the lower portion of the casing 14 of the hydraulic transmisison serves as sump or collecting tank for the actuating fluid which latter is conveyed either to the two converters 15a and 16a or to the two converters 15b and 16b by means of a pump 33 driven by the pump shaft 18 and through the intervention of a control valve not shown in the drawing.

Referring now to Fig. 2 the arrangement shown therein illustrates by way of example a control of the hydraulic transmission in such a manner that the said transmission will take in just the desired input. The reference numeral 28 designates one of the control rings by means of which the guide vanes of the converter are adjusted. The control ring 28 is connected with the control shaft 30 by means of rods 29. The control shaft 30 is actuated by the servo-motor 32 through the crank 31. There is, furthermore, provided a rotary magnet generally designated M which responds to the current or the electric power of the driving motor. The movable part of the rotary magnet M carries a two arm lever 41 having one of its ends straddled by the adjacent ends of two springs 43 arranged in a yoke 42. The yoke 42 is so arranged that, by means of a small electric motor 44 with adjusting transmission 45, it may be moved in the longitudinal direction of the spindle 46. Depending upon the direction of rotation of motor 44 the yoke 42 will be moved in one or the other direction of the longitudinal axis of the spindle 46. The reversible electric motor 44 is controlled from the engineer's cab and is intended to adjust the desired rated value on the rotary magnet 40. The other end of the two arm lever 41 is pivotally connected with the rod system 47 for the control valve 48 of the servo-motor 42.

In addition to the above, there is also provided an elastic restoring or follow-up mechanism 49 pertaining to the servo-motor 42.

The engineer of the vehicle, by means of the adjusting motor 44, sets a predetermined value for the motor current or the motor power. Whenever the current or power differs from the said set value, the rotary magnet 40 shows an angular deviation and through the intervention of the servo-motor 32 adjusts the guide blades of the hydraulic torque converter so that the power intake of the respective operative converter, i. e., the converter which is filled with actuating fluid, is increased or decreased to such an extent that the set rated value on the rotary magnet is again restored.

Referring now to Fig. 3, the arrangement shown therein represents a device which is adapted automatically so as to adjust the respective power intake of the hydraulic transmission that a predetermined speed set by the engineer will be maintained. Furthermore, this device is provided with an electric power limiting mechanism and with a temperature limiting device. More specifically, a speed measuring pump 51, i. e., a pump driven in proportion to the driving speed of the vehicle, is connected to the pressure side of a servo-motor 52. The piston 52' of the servo-motor is thus actuated by a pressure corresponding to the driving speed. The piston rod 53 is pivotally connected to a lever 54 which through the lever system 55 actuates the control valve 56 of the servo-motor 57. The servo- or control motor 57 operates in a manner similar to that of the servo-motor 32 described in connection with Fig. 2 and acts upon the fluid transmission to influence the power intake thereof. The reference numeral 58 designates a dash-pot for a yieldable restoring or follow up of a servo-motor system, while the reference numeral 59 designates the returning spring. The cylinder of the dash-pot 58 is rigidly connected with the piston rod of the servo-motor 47, while the piston 58' of the dash-pot 58 is by means of the spring arrangement 59 in the condition of inertia always returned to the same position. Thus, in the said condition the pivot of the two-arm lever in the rod system 55 is definitely determined and located. If an adjusting step is carried out by means of which the lever 54 and, through the rod system 55, also the control valve 56 is moved, the thus initiated movement of the servo-motor 57 also causes a movement of the cylinder 58" of the dash-pot 58. Inasmuch as first the dash-pot acts like a rigid connection, the movement of the dash-pot cylinder 58" causes the fulcrum 55' of the two arm lever pertaining to the rod system 55 to move away from its normal position against the thrust of the spring 59. As a result thereof, the control valve and thus the control operation is retarded in order to prevent over-controls. Subsequently, however, due to the gradual passing of the oil from one side of the piston 58' to the other side thereof through corresponding throttling apertures, the springs 59 gradually return the fulcrum 55' of the rod system 55 to its normal position.

Furthermore, connected with the lever 54 is a spring 60 adapted to have its tension varied in accordance with the desired driving speed. This adjustment of the spring tension or thrust is effected by means of a motor 61 and transmission 62 which motor may selectively be switched on and off from the engineer's cab.

As long as the vehicle is driving at the set speed, the lever 54 is under the influence of the piston 52 on one hand and the spring 60 on the other hand while said spring 60 occupies its intermediate position shown in the drawing. The respective adjustment of the spring brings about that the lever 54 at a higher or lower speed, depending upon the driving requirements, occupies its intermediate position.

The pivot point 63 of the lever 54 is during normal operation likewise located in the position shown in the drawing. The lever 54 is at 63 pivotally connected to a lever 71 and through the latter to a two arm lever 64. One end of the lever 64 is pivotally connected to the rotary magnet 65 while the other end of the two arm lever 64 is pivotally connected to the thermostat 66. The shifting arm 67 of the rotary magnet is pulled against a fixed abutment 69 by means of an adjustable spring 68. Similarly, during normal operation the two-arm lever 64 rests against a fixed abutment 70.

The thermostat which, of course, may also be adjustable responds to the temperature of the actuating fluid of the hydraulic transmission, whereas the angular deviation of the rotary magnet is proportional to the motor output. The adjustment is such that the pivot point 63 of the lever 54 will not change as long as the current intensity or the power remains below a predetermined temperature. However, when one of these limitation values is exceeded, either a shifting arm 67 of the rotary magnet moves away from its abutment 69 or the two arm lever 64 moves away from its abutment 70, depending on whether the current or power, or the temperature brings about the control impulse. As a result thereof the pivot point of the lever 54 is moved so as to throttle the power intake of the hydraulic transmission. The thermostat 66 may be arranged in the sump or in an oil conduit, or may be connected to the winding of the stator of the electric motor.

*Driving operation*

Prior to the starting of the vehicle, the hydraulic circuits are emptied and the vanes are brought into closing position. With those converters which cannot be emptied, only the vanes are in closed position. In order to start the vehicle, the electric induction motor is started, the acceleration of which is effected in an extremely short time since it is merely necessary to accelerate the masses of the rotor and the primary parts of the fluid transmission. The driving crank is in its idling position. As soon as the engineer shifts to the first speed, the hydraulic circuits intended for the starting are being filled while simultaneously the vanes are moved into their first opening position. When shifting further up to the higher speeds, the vanes are opened further and further up to the maximum position and in view of the torques conveyed by the fluid due to the turbine wheels, the engine begins to move. Each position of the driving crank has associated therewith a predetermined relationship between pulling power and travelling or vehicle speed. As soon as a predetermined speed has been obtained, with fluid transmissions according to Fig. 1 having a plurality of circuits, an automatic emptying of the converters 15a and 16a for starting and low speeds is effected, and the converters 15b and 16b (for the intermediate and high speeds) are filled.

In order to bring the engine to a stand-still, it is merely necessary that the engineer returns the driving crank to the idling position as a result of which the circuits will empty and the vanes will move into closing position. In this condition, no power is conveyed any longer to the axles so that a free wheel effect is obtained. By applying the brakes, the engine will be brought to a stop.

It is, of course, possible without any difficulties, in the idling position during which the vehicle is still running to shift again to any desired driving position in which instance automatically that circuit will be filled which corresponds to the just prevailing travelling speed or the travelling speed and the respective position of the blades.

The above mentioned operational steps are carried out in a corresponding manner when using a single torque converter in conjunction with a speed change gear. The jaw or disc clutches and the required control movements of the throw-out turbine or the guide vanes are likewise automatically carried out in conformity with the driving speed and selected driving stage as outlined above.

It is, of course, understood that the present invention is, by no means, limited to the particular arrangements shown in the drawings but also comprises any modifications within the scope of the appended claims.

What I claim is:

1. For use in connection with electric induction motor means, especially squirrel-cage rotor-induction motor means, the combination of: infinitely variable hydrodynamic power conveying means arranged for driving connection with said motor means and including at least one hydraulic torque converter; said torque converter having at least one driving bladed rotor element, at least one driven bladed rotor element and at least one stationary bladed element; said bladed elements being relatively positioned to form a working chamber for the transmission of work liquid from one rotor element to the other; means associated with said working chamber for keeping said working chamber totally and permanently filled with work liquid while the converter is in operation; and control means positioned in said working chamber and operable infinitely to vary the flow of liquid in said working chamber.

2. For use in connection with electric induction motor means, especially squirrel-cage rotor-induction motor means, the combination of: infinitely variable hydrodynamic power conveying means arranged for driving connection with said motor means and including at least one hydraulic torque converter; said torque converter having at least one driving bladed rotor element, at least one driven bladed rotor element and at least one stationary bladed element; said bladed elements being relatively positioned to form a working chamber for the transmission of work liquid from one rotor element to the other; means associated with said working chamber for keeping said working chamber totally and permanently filled with work liquid while the converter is in operation; and first and second control means positioned in said working chamber and operable infinitely to vary the flow of liquid in said working chamber.

3. For use in connection with electric induction motor means, especially squirrel-cage rotor-induction motor means, the combination of: infinitely variable hydrodynamic power conveying means arranged for driving connection with said motor means and including at least one hydraulic torque converter; said torque converter having at least one driving bladed rotor element, at least one driven bladed rotor element and at least one stationary bladed element; said bladed elements being relatively positioned to form a working chamber for the transmission of work liquid from one rotor element to the other; means associated with said working chamber for keeping said working chamber totally and permanently filled with work liquid while the converter is in operation; at least one torque converter having adjustable vanes and an axially shiftable vane ring for varying the flow of liquid in said working chamber.

4. For use in connection with electric induction motor means, especially squirrel-cage rotor-induction motor means, the combination of: a hydro-mechanical compound transmission comprising infinitely variable hydrodynamic power conveying means and mechanical change speed gear means, said power conveying means being arranged for driving connection with said motor means and including at least one hydraulic torque converter; said torque converter having at least one driving bladed rotor element, at least one driven bladed rotor element and at least one stationary bladed element; said bladed elements being relatively positioned to form a working chamber for the transmission of work liquid from one rotor element to the other; means associated with said working chamber for keeping said working chamber totally and permanently filled with work liquid while the converter is in operation; and control means positioned in said working chamber and operable infinitely to vary the flow of liquid in said working chamber.

5. An arrangement according to claim 4, in which the blades of at least one of said elements are adjustable for varying the flow of liquid in said working chamber and facilitating the shifting of said mechanical change speed gear.

6. For use in connection with electric induction motor means, especially squirrel-cage rotor-induction motor means, the combination of: infinitely variable hydromechanical two-way power conveying means arranged for driving connection with said motor means and including at least one hydraulic torque converter; said torque converter having at least one driving bladed rotor element, at least one driven bladed rotor element and at least one stationary bladed element; said bladed elements being relatively positioned to form a working chamber for the transmission of work liquid from one rotor element to the other; means associated with said working chamber for keeping said working chamber totally and permanently filled with work liquid while the converter is in operation; and control means positioned in said working chamber and operable infinitely to vary the flow of liquid in said working chamber.

7. For use in connection with electric induction motor means, especially squirrel-cage rotor-induction motor means, the combination of: an infinitely variable combined hydro-mechanical power dividing transmission arranged for driving connection with said motor means and including at least one hydraulic torque converter; said torque converter having at least one driving bladed rotor element, at least one driven bladed rotor element and at least one stationary bladed element; said bladed elements being relatively positioned to form a working chamber for the transmission of work liquid from one rotor element to the other; means associated with said working chamber for keeping said working chamber totally and permanetly filled with work liquid while the converter is in operation; control means positioned in said working chamber and operable infinitely to vary the flow of liquid in said working chamber, and power dividing planetary gear means including a first member drivingly connected to said motor means and a second member drivingly connected to said driving bladed rotor element of the torque converter, said planetary gear means also including a third member drivingly connected to the output shaft of said hydro-mechanical power dividing transmission.

8. For use in connection with electric induction motor means, especially squirrel-cage rotor-induction motor means, the combination of: infinitely variable hydrodynamic power conveying means arranged for driving connection with said motor means and including at least two variable torque converters designed to drive one and the same axle of a vehicle, each of said torque converters being designed for a different travelling speed range and having at least one driving bladed rotor element, at least one driven bladed rotor element and at least one stationary bladed element; said bladed elements being relatively positioned to form a working chamber for the transmission of work liquid from one rotor element to the other of the same torque converter; means respectively associated with said working chambers for keeping the respective working chamber totally and permanently filled with work liquid while the respective converter is in operation; and control means respectively positioned in said working chambers and operable infinitely to vary the flow of liquid in said working chambers and selectively to make either one of said torque converters effective and ineffective.

9. For use in connection with electric induction motor means, especially squirrel-cage rotor-induction motor means, the combination of: infinitely variable hydrodynamic power conveying means arranged for driving connection with said motor means and including at least two variable torque converters designed to drive one and the same axle of a vehicle, a plurality of mechanical gear transmissions respectively providing different transmission ratios and arranged for respective connection with said converters, each of said torque converters having at least one driving bladed rotor element, at least one driven bladed rotor element and at least one stationary bladed element; said bladed elements being relatively positioned to form a working chamber for the transmission of work liquid from one rotor element to the other of the same torque converter; means respectively associated with said working chambers for keeping the respective working chamber totally and permanently filled with work liquid while the respective converter is in operation; and control means respectively positioned in said working chambers and operable infinitely to vary the flow of liquid in said working chambers.

10. An arrangement according to claim 1, which includes pump means and control valve means for selectively filling or emptying said converters to make the same effective or ineffective respectively.

11. For use in connection with electric induction motor means, especially squirrel-cage rotor induction motor, the combination of: infinitely variable hydrodynamic power conveying means arranged for driving connection with said motor means and including a first variable torque converter designed for the starting speed range of a vehicle; a second variable torque converter designed for a higher speed range; both of said torque converters being operable to drive one and the same axle of a vehicle; each of said torque converters having at least one driving bladed rotor element, at least one driven bladed rotor element and at least one stationary bladed element; the bladed elements of each converter being relatively positioned to form a working chamber for the transmission of work liquid from one rotor element to the other of the same torque converter; control means respectively positioned in said working chamber and operable infinitely to vary the flow in said working chambers, and means responsive to predetermined factors of operation of said power conveying means for respectively automatically bringing about a change-over from said first converter to said second converter and vice versa.

12. An arrangement according to claim 11, in which the change-over from said first converter to said second converter is effected in response to a first speed of said power conveying means, and the change-over from said second converter to said first converter is effected in response to a second speed of said power conveying means lower than said first speed.

13. For use in connection with electric induction motor means as driving means for a vehicle with at least two axles, the combination of: infinitely variable hydrodynamic power conveying means arranged for driving connection with said motor means and including two hydraulic torque converters for respective driving connection with said two axles; said torque converters having at least one driving bladed rotor element, at least one driven bladed rotor element and at least one stationary bladed element; the bladed elements of each torque converter being relatively positioned to form a working chamber for the transmission of work liquid from one rotor element to the other rotor element of the same converter; two individual mechanical reversing gear means adapted respectively to be driven by said converters and respectively arranged for driving connection with said two axles, and control means respectively positioned in said working chamber and operable infinitely to vary the flow of liquid in said working chambers.

14. For use in connection with electric induction motor means as driving means for a vehicle with at least two individually drivable axles, the combination of: a plurality of variable hydro-mechanical transmission means arranged for driving connection with said motor means and designed respectively to drive said axles; said transmission means including two hydraulic torque converters for respective driving connection with said two axles; said torque converters having at least one driving bladed rotor element, at least one driven bladed rotor element and at least one stationary bladed element; the bladed elements of each torque converter being relatively positioned to form a working chamber for the transmission of work liquid from one rotor element to the other rotor element of the same converter; and control means respectively positioned in said working chamber and operable to infinitely vary the flow of liquid in said working chambers to control the driving power conveyed to all of the individually drivable axles.

15. For use in connection with electric induction motor means as driving means for a vehicle with at least two individually drivable axles, the combination of: infinitely variable hydro-dynamic power conveying means arranged for driving connection with said motor means and including two hydraulic torque converters for respective driving connection with said two axles; said torque converters having at least one driving bladed rotor element, at least one driven bladed rotor element and at least one stationary bladed element; the bladed elements of each troque converter being relatively positioned to form a working chamber for the transmission of work liquird from one rotor element to the other rotor element of the same converter; control means respectively positioned in said working chamber and operable to infinitely vary the flow of liquid in said chambers, and a manually operable device for pre-selecting the current strength of said induction motor means, said device being operatively connected to said control means.

16. For use in connection with electric induction motor means as driving means for a vehicle with at least two individually drivable axles, the combination of: infinitely variable hydro-dynamic power conveying means arranged for driving connection with said motor means and including two hydraulic torque converters for respective driving connection with said two axles; said torque converters having at least one driving bladed rotor element, at least one driven bladed rotor element and at least one stationary bladed element; the bladed elements of each torque converter being relatively positioned to form a working chamber for the transmission of work liquid from one rotor element to the other rotor element of the same converter; control means respectively positioned in said working chamber and operable to infinitely vary the flow of liquid in said working chambers; and a manually operable device operatively connected with said control means and adapted to be set for a desired output speed of said hydro-dynamic power conveying means to thereby pre-determine a desired speed for said vehicle.

17. For use in connection with electric induction motor means, especially squirrel-cage rotor-induction motor means, the combination of: infinitely variable hydro-dynamic power conveying means arranged for driving connection with said motor means and including at least one hydraulic torque converter; said torque converter having at least one driving bladed rotor element, at least one driven bladed rotor element and at least one stationary bladed element; said bladed elements being relatively positioned to form a working chamber for the transmission of work liquid from one rotor element to the other; means associated with said working chamber for keeping said working chamber totally and permanently filled with work liquid while the converter is in operation; first control means operable selectively to throw said hydro-dynamic power conveying means in or out; second control means positioned in said working chamber of said torque converter and operable to vary infinitely the flow in said working chamber; third control means adapted selectively to throw said electric motor means in or out; and a single manually operable control device operatively connected with said first, second and third control means for controlling each of them in conformity with the various driving stages.

18. An arrangement according to claim 1, which includes temperature responsive means operatively connected with said control means and adapted in response to a predetermined temperature in said electric motor means to bring about actuation of said control means for changing the power intake of said converters.

19. An arrangement according to claim 1, which includes temperature responsive means operatively connected to said control means and adapted in response to a predetermined temperature in the work liquid in said working chamber to bring about actuation of said control means for changing the power intake of said converters.

20. For use in connection with electric induction motor means as driving means for a vehicle provided with additional electrical equipment, the combination of: infinitely variable hydro-dynamic power conveying means arranged for driving connection with said motor means and including at least one hydraulic torque converter; said torque converter having at least one driving bladed rotor element, at least one driven bladed rotor element and at least one stationary bladed element; said bladed elements being relatively positioned to form a working chamber for the transmission of work liquid from one rotor element to the other; means associated with said working chamber for keeping said working chamber totally and permanently filled with work liquid while the converter is in operation; control means positioned in said working chamber and operable infinitely to vary the flow of liquid in said working chamber; and a single manually operable control device operatively connected with said control means and designated for connection with said motor means and said electrical equipment, said single control device being arranged in conformity with the various driving stages to bring about the throwing in and the taking out of said electrical equipment, the throwing in and the taking out of said electric motor means, and the throwing in and the taking out of said control means.

21. For use in connection with electric induction motor means as driving means for a vehicle having a plurality of axles adapted to be driven individually, the combination of: a plurality of infinitely variable hydraulic torque converters individually adapted to be drivingly connected with at least a group of said axles, each of said torque converters having at least one driving bladed rotor element, at least one driven bladed rotor element and at least one stationary bladed element; the bladed elements of each torque converter being relatively positioned to form a working chamber for the transmission of work liquid from one rotor element to the other rotor element of the same converter, and control means respectively positioned in said working chamber and operable infinitely to vary the flow of liquid in said working chamber for varying the power transfer from the respective torque converter to the axles driven thereby, the arrangement being such that with increasing driving speed the number of axles being driven individually will decrease.

22. A drive according to claim 21, with two individually driven axles, characterized in that each of said axles is individually rotatable by a torque converter designed to furnish half of the total power required for a first travelling speed range of the vehicle, and also characterized by an additional torque converter designed for the full power required for a second travelling speed range of the vehicle and arranged for individual driving connection with one of said axles only.

23. A drive according to claim 21 with two individually driven axles, which includes a first torque converter designed for half the power required for a first speed range, said first torque converter being arranged for individual driving connection with one of said axles, and a second torque converter designed for transmitting twice the power of said first torque converter and arranged for individual driving connection with the other axle, and control means operatively connected with said second torque converter and operable to vary the power intake thereof to thereby allow driving said second torque converter with throttled power intake within said first speed range of said vehicle and with full power intake within another speed range of said vehicle.

24. For use in conection with electric induction motor means, the combination of: infinitely variable hydro-dynamic power conveying means arranged for driving connection with said motor means and including at least one hydraulic torque converter; said torque converter having at least one driving bladed rotor element, at least one driven bladed rotor element and at least one stationary bladed element; said bladed elements being relatively positioned to form a working chamber for the transmission of work liquid from one rotor element to the other; and means associated with said working chamber for keeping said working chamber totally and permanently filled with work liquid while the converter is in operation; said stationary bladed elements having adjustable blades operable infinitely to vary the flow of liquid in said working chamber.

25. For use in connection with electric induction motor means, the combination of: infinitely variable hydro-dynamic power conveying means arranged for driving connection with said motor means and including at least one hydraulic torque converter; said torque converter having at least one driving bladed rotor element, at least one driven bladed rotor element and at least one stationary bladed element; said bladed elements being relatively positioned to form a working chamber for the transmission of work liquid from one rotor element to the other; and means associated with said working chamber for keeping said working chamber totally and permanently filled with work liquid while the converter is in operation; one of said bladed rotor elements having adjustable blades operable infinitely to vary the flow of liquid in said working chamber.

References Cited in the file of this patent
UNITED STATES PATENTS

| | | |
|---|---|---|
| 2,063,471 | Stedefeld | Dec. 8, 1936 |
| 2,106,843 | Hahn | Feb. 1, 1938 |
| 2,146,569 | Fichtner | Feb. 7, 1939 |
| 2,150,150 | Burrows | Mar. 14, 1939 |
| 2,155,740 | Seibold | Apr. 25, 1939 |
| 2,213,342 | Gossler | Sept. 3, 1940 |
| 2,213,349 | Seibold | Sept. 3, 1940 |
| 2,327,647 | Jandasek | Aug. 24, 1943 |
| 2,416,980 | Burns | Mar. 4, 1947 |
| 2,599,450 | Henning | June 3, 1952 |
| 2,601,548 | Monroe | June 24, 1952 |
| 2,612,755 | Szczeniowski | Oct. 7, 1952 |
| 2,618,932 | Taup | Nov. 25, 1952 |
| 2,638,798 | Yingling | May 19, 1953 |